(12) United States Patent
Vleurinck et al.

(10) Patent No.: US 11,840,474 B2
(45) Date of Patent: Dec. 12, 2023

(54) HEAT RESISTANT SEPARATION FABRIC

(71) Applicant: NV BEKAERT SA, Zwevegem (BE)

(72) Inventors: Jos Vleurinck, Oordegem (BE); Frank De Ridder, Hofstade-Aalst (BE); Véronique Vergote, Moeskroen (BE)

(73) Assignee: NV BEKAERT SA, Zwevegem (BE)

(*) Notice: Subject to any disclaimer, the term of this patent is extended or adjusted under 35 U.S.C. 154(b) by 161 days.

(21) Appl. No.: 16/754,213

(22) PCT Filed: Nov. 15, 2018

(86) PCT No.: PCT/EP2018/081415
§ 371 (c)(1),
(2) Date: Apr. 7, 2020

(87) PCT Pub. No.: WO2019/096924
PCT Pub. Date: May 23, 2019

(65) Prior Publication Data
US 2021/0188693 A1 Jun. 24, 2021

(30) Foreign Application Priority Data

Nov. 17, 2017 (EP) .................................. 17202267

(51) Int. Cl.
C03B 40/00 (2006.01)
D02G 3/12 (2006.01)
(Continued)

(52) U.S. Cl.
CPC ........ C03B 40/005 (2013.01); C03B 23/0357 (2013.01); D02G 3/12 (2013.01);
(Continued)

(58) Field of Classification Search
CPC .......... C03B 40/02; C03B 23/03; D02G 3/12; D02G 3/443; D06M 11/00; D06M 11/80;
(Continued)

(56) References Cited

U.S. PATENT DOCUMENTS 3,783,013 A    1/1974  Seeman
4,003,867 A *  1/1977  Cooper .................... B22C 3/00
                                                              523/516
(Continued)

FOREIGN PATENT DOCUMENTS

EP    0 972 751    6/2003
EP    1 141 457    10/2004
(Continued)

OTHER PUBLICATIONS

International Search Report dated Dec. 13, 2018 in International (PCT) Application No. PCT/EP2018/081415.

Primary Examiner — Jeremy R Pierce
Assistant Examiner — Christine X Nisula
(74) Attorney, Agent, or Firm — Wenderoth, Lind & Ponack, L.L.P.

(57) ABSTRACT

Heat resistant separation fabric consisting out of yarns, wherein the yarns comprise metal fibers; wherein the heat resistant fabric comprises boron nitride particles distributed throughout the complete thickness of the fabric; wherein boron nitride particles are present between metal fibers in the yarns; wherein the amount of the boron nitride particles present on the surface of the fabric is not more than the amount of the boron nitride particles present in the bulk of the fabric.

10 Claims, 3 Drawing Sheets

(51) Int. Cl.
  *D06M 11/80* (2006.01)
  *D06M 23/08* (2006.01)
  *D06M 11/00* (2006.01)
  *C03B 23/035* (2006.01)
  *D06M 101/00* (2006.01)

(52) U.S. Cl.
  CPC ............ *D06M 11/00* (2013.01); *D06M 11/80* (2013.01); *D06M 23/08* (2013.01); *C03B 2215/68* (2013.01); *D06M 2101/00* (2013.01); *D10B 2101/20* (2013.01); *Y10T 442/209* (2015.04)

(58) Field of Classification Search
  CPC ............ D06M 11/58; D06M 2101/20; D10B 2101/20; Y10T 442/209; Y10T 442/475; D01F 11/124
  USPC .......................................... 442/140, 301, 302
  See application file for complete search history.

(56) References Cited

U.S. PATENT DOCUMENTS

| 4,274,857 | A |   | 6/1981 | Wolfe |           |
|-----------|---|---|--------|-------|-----------|
| H480      | H |   | 6/1988 | Welch |           |
| 5,541,238 | A | * | 7/1996 | Yamada | D01F 11/12 |
|           |   |   |        |        | 523/200    |
| 5,631,067 | A | * | 5/1997 | Anaf   | C03B 23/023 |
|           |   |   |        |        | 428/902    |
| 2007/0054057 | A1 | * | 3/2007 | Matje | B22D 17/2007 |
|           |   |   |        |        | 106/38.22  |

FOREIGN PATENT DOCUMENTS

| JP | 11-6034      | 1/1999  |
|----|--------------|---------|
| WO | 00/40792     | 7/2000  |
| WO | 2011/116992  | 9/2011  |
| WO | 2011/117048  | 9/2011  |
| WO | 2014/191193  | 12/2014 |

* cited by examiner

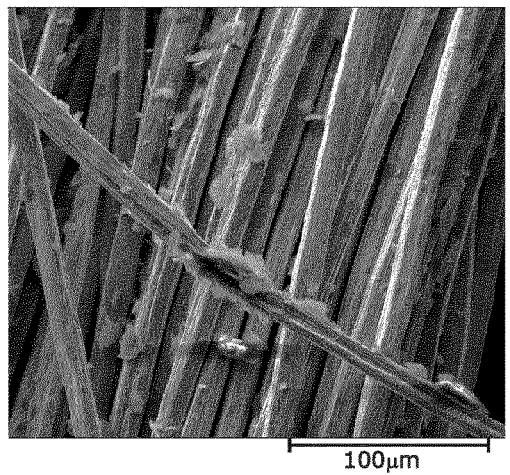
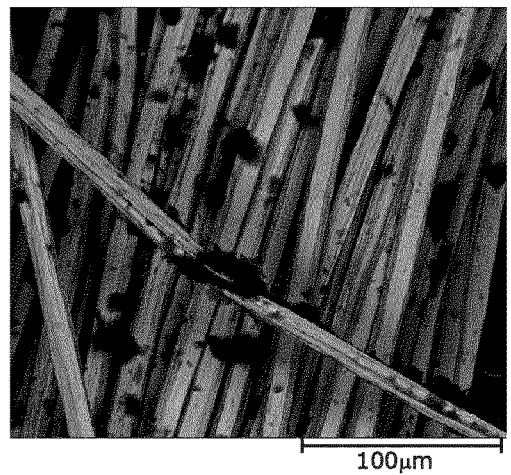
Fig. 5a                                  Fig. 5b
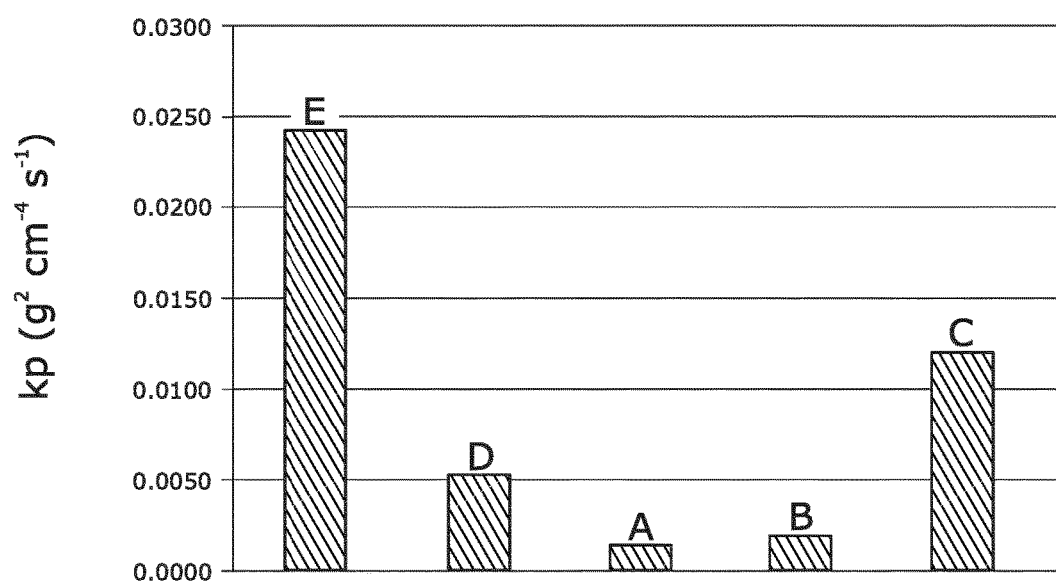
Fig. 6

HEAT RESISTANT SEPARATION FABRIC

TECHNICAL FIELD

The invention relates to the field of heat resistant separation fabrics and methods to make such fabrics. Such heat resistant separation fabrics are e.g. used as mould, ring or roller covering in the production of shaped car glass.

BACKGROUND ART

The use of heat resistant separation fabrics comprising metal fibers is known. Exemplary use is e.g. in the production of car glass, where such fabrics are used as protective covering for bending moulds (see in WO00/40792 or in WO2011/116992), for transport rollers (see in WO2011/117048) or as protective strips for quench rings (see in EP-B1-0972751). The heat resistant separation fabrics have a finite lifetime. They need to be replaced after some time. The trigger for replacement mostly is the deterioration of the optical quality of the glass after some time, although it is also possible that holes occur in the fabric due to its ageing in use.

As the heat resistant separation fabrics as well as the operation to replace heat resistant separation fabrics are costs in the manufacturing processes, users of heat resistant separation fabrics are looking for ways to increase the useful lifetime of the heat resistant separation fabrics. With useful lifetime is meant the time during which products with good quality (e.g. good optical quality in the case of car glass manufacturing) can be produced.

For car glass manufacturing operations in which the high temperatures occur, heat resistant separation fabrics consisting out of metal fibers, e.g. stainless steel fibers are used. Lifetime of heat resistant stainless steel fabric is often restricted by loss of mechanical strength due to high temperature oxidation. Improving the resistance against this type of oxidation will in these cases improve the lifetime of products. Solutions have been explored in the prior art including optimizing alloy composition and applying thick fibers and/or thick yarns. However, the optimized composition makes product more costly or more difficult to process. The application of thicker yarn or thicker fibres negatively impacts on optical quality of produced glass.

DISCLOSURE OF INVENTION

A primary objective of the invention is to provide a heat resistant separation fabric that has longer lifetime than the state of art heat resistant separation fabrics.

Another objective of the invention is to provide a heat resistant separation fabric that can be produced industrially in an economic way.

Yet another objective of the invention is to provide a heat resistant separation fabric that has overall good properties when working at high temperature (+/−700° C.).

According a first aspect of the invention a heat resistant separation fabric is provided. The heat resistant separation fabric consists out of yarns, wherein the yarns comprise metal fibers. The heat resistant fabric comprises boron nitride particles distributed throughout the complete thickness of the fabric, wherein boron nitride particles are present between metal fibers in the yarns and wherein the amount of the boron nitride particles present on the surface of the fabric is not more than the amount of the boron nitride particles present in the bulk of the fabric.

According to the present invention, the amount of the boron nitride particles present on the surface of the fabric is equal to or smaller than the amount of the boron nitride particles present in the bulk of the fabric. The amount of the boron nitride particles present on the surface of the fabric can be equal to the amount of the boron nitride particles present in the bulk of the fabric. This is particularly hold for the heat resistant separation fabric as produced. On the other hand, heat resistant separation fabrics as produced are normally washed to remove lubricants before using. After washing, the amount of the boron nitride particles present on the surface of the fabric can be slightly smaller than the amount of the boron nitride particles present in the bulk of the fabric.

The heat resistant separation fabric according to the present invention has superior oxidation resistance. The rate of oxidation of the heat resistant separation fabric is significantly reduced and the lifetime of the heat resistant separation fabric is thus prolonged. This can be attributed to the uniform distribution of boron nitride particles within the heat resistant separation fabric. The uniform distributions of boron nitride particles prevent localized oxidation and also prevent build-up of any deposits which can cause imprinting defects. Moreover, during the course of operation of a glass production or treatment line, in contrast to a boron nitride coating on the surface of a heat resistant separation fabric (where the wear of the coating at high load points may occur), the application of such a heat resistant separation fabric ensures the uniformity and consistency of boron nitride distribution within the heat separation fabric during its lifetime.

In addition, it is found that the heat separation fabric of the invention has high strength which could also contribute to the long lifetime.

Applying the heat resistant separation fabric according to the present invention in operation of a glass production or treatment line, there provides additional benefits: the abrasion between the fabric and the heated object can be reduced; the produced glass has better optics since the fabric after oxidation stays soft; and the glass can be easily released from the mould without sticking and marking.

The heat resistant separation fabric of the present invention can be a woven fabric, a knitted fabric or a braided fabric. Knitted structures are preferably used to cover moulds for glass bending process since knitted surfaces can be draped better on moulds and less or no folds will be created when bending the knitted fabric, especially on three-dimensionally shaped surfaces or moulds.

Different knitting structures can be used to provide the fabric as subject of the invention. It was found that knitting structures single jersey ½, single jersey ⅓ and single jersey ¼ can be used to provide knitted fabrics, comprising metal fibers. Other single jersey structures, with more floating yarns such as single jersey ⅕, single jersey ⅙ or more, can be used.

By single jersey structures is meant a knitting structure, obtainable by using one needle bed, providing one stitch for every needle in the needle bed per row of stitches. Typically, the fabric which is subject of the invention has an air permeability of more than 400 l/dm²/min and preferably more than 750 l/dm²/min. The air permeability is measured using a circular test surface of 20 cm² and an under pressure of 100 Pa. The weight of the fabric can be more than 600 g/m² and less than 2000 g/m². The thickness of the fabric can be not less than 0.8 mm and preferably more than 0.9 mm.

Different gauges can be used to provide the fabric as subject of the invention. The gauge indicates the number of needles per inch on the needle bed or beds of the knitting machine. Typically gauges from 10 to 32 can be used. Preferably, the knitted fabric has a maximal gauge of 24 needles/inch. Best fabrics were provided using gauge 20 or less.

The heat resistant separation fabric of the present invention consists out of yarns. The yarns of the heat resistant separation fabric can be spun, filament or texturized yarns. Spun yarn is made by twisting staple fibers together to make a cohesive thread. Filament yarn consists of filament fibres (very long continuous fibres) either twisted together or only grouped together. Texturized yarns are made by a process of air texturizing filament yarns, which combines multiple filament yarns into a yarn with some of the characteristics of spun yarns.

The yarn comprises at least one fiber bundle comprising metal fibers. In a preferred embodiment, the yarn used in the knitted fabric is built from 2, 3, 4, 5, 6, 7, 8, 9, 10, 11 or 12 bundles or single yarns. Even more preferably, the yarn is build form only 3, 4, 5, 6 or 7 bundles or single yarns. In the most preferred embodiment, the yarn used in the knitted fabric is built from 3 or 7 fiber bundles or single yarns. Use of 3 or 7 bundles or single yarns in a yarn provides a yarn which more or less resembles a perfectly round circle, which surprisingly proved to provide even better performing knitted fabrics which reduce, in use, the markings on the bent glass surface.

Each of the fiber bundles are defined by an equivalent bundle diameter. The equivalent bundle diameter is to be understood as the diameter of an imaginary bundle having a circular radial cross section, which cross section has a surface area identical to the equivalent fiber diameter multiplied by the amount of fibers in the bundle or single yarn. The equivalent bundle diameter of each of the fiber bundles in the yarn are equal to each other or differ at most 40%.

Different yarns with different metrical numbers can be used to provide the fabric as subject of the invention. The metrical number (Nm) of a yarn is an expression for the fineness of the yarn. It gives the length in meter of 1 gram mass of yarn. To obtain a fabric as subject of the invention, yarn bundles with preferably metrical numbers Nm 4 to 6 can be used. Finer yarn bundles such as Nm 7.5 or Nm 10 could also be used.

At least partially, the yarns will contain metal fibers. Usually, but not necessarily, stainless steel fibers are used. Alloys such as AISI 316 or AISI 316L, AISI 347, or other alloys out of the AISI 300 type are used. Also alloys out of the AISI-400 type or Aluchrome-type alloys can be used. These fibers can be bundle drawn, be made by shaving them from a coil, or melt extracted.

These metal fibers have an equivalent fiber diameter usually between 1 and 100 µm, and more typically between 6 and 25 µm. The equivalent diameter is the diameter of the circle, which has the same surface as the fibre section when cut perpendicularly to the axis of the fibres.

Possibly, other high temperature fibers, such as glass fibers, ceramic fibers, meta-aramid fibers, para-aramid fibers, carbon fibers, preox-fibers and other high temperature resistant man-made fibers can be used, next to the metal fibers. The fiber bundles, of which at least one contains metal fibers, can be intimately blended and plied to a three or more plied yarn or the yarn can be a three- or more plied yarn, where some or all of the bundles or single yarns are made out of one fiber type. By plying yarns, it is meant that two or more bundles or yarns are given a torsion round the direction of the axes of the bundles or yarns resulting in a plied yarn.

According to the present invention, boron nitride particles are present between metal fibers in the yarns. Boron nitride exists in various crystalline forms that are isoelectronic to a similarly structured carbon lattice. According to the present invention, the boron nitride particles comprise or consist out of boron nitride in the hexagonal crystalline form. The hexagonal form corresponding to graphite is the most stable and soft among boron nitride polymorphs. The particle size of the boron nitride particles used in the present invention can be in the range of 1 nm to 10 µm, preferably in the range of 10 nm to 10 µm, more preferably in the range of 100 nm to 10 µm, and most preferably in the range of 100 nm to 5 µm.

According to the present invention, preferably the boron nitride particles are bonded onto the surface of the metal fibers by means of an inorganic binder. The inorganic binder comprises or consists out of aluminium oxide, aluminium phosphateor magnesium silicate. The inorganic binder preferably comprises or consists out of mono-aluminum phosphate. The inorganic binder acts as an adhesive for the boron nitride. The ratio of boron nitride to inorganic binder is selected to give desired oxidation resistance, lubrication, adhesion and protection properties. The presence of boron nitride and aluminium phosphate in the fabric is respectively in the range of 0.001 wt % to 5 wt %, preferably in the range of 0.01 wt % to 1 wt %, and more preferably in the range of 0.1 wt % to 1 wt %.

According to a second aspect of the present invention, it is provided a mould for bending car glass products or mirrors, wherein the surface of the mould making contact with hot glass or mirrors is covered by any of the above described heat resistant separation fabric.

According to a third aspect of the present invention, it is provided a process of bending car glass products or mirrors, wherein a mould as described above is used; wherein the temperature of the hot glass in contact with the heat resistant separation fabric is in a range between 600° C. to 800° C.

According to a fourth aspect of the present invention, it is provided a roll of a heat resistant separation fabric comprising a heat resistant separation fabric as described above; and a core onto which the heat resistant fabric is wound in a multiple number of layers.

According to a fifth aspect of the present invention, it is provided a bobbin of yarn comprising a spun, filament or texturized yarn and a core onto which the yarn is wound, preferably cross-wound, wherein the yarn comprises fibers, wherein all fibers in the yarn are metal fibers and wherein boron nitride particles are present between metal fibers in the yarn.

According to a sixth aspect of the present invention, it is provided a method to produce a bobbin of yarn as the above, comprising steps of applying an aqueous dispersion of boron nitride particles and preferably also of an inorganic binder onto a yarn comprising fibers, wherein all fibers in the yarns are preferably metal fibers, e.g. stainless steel fibers, e.g. by means of spraying, immersion in a bath or a lick roll; and winding, preferably cross-winding, the yarn on a core.

The bobbin of yarn as produced according to the present invention can be used to produce the heat separation fabric as described above. According to yet another aspect of the present invention, it is provided a method to produce a heat resistant separation fabric, comprising steps of a) applying an aqueous dispersion of boron nitride particles and preferably also of an inorganic binder onto a yarn comprising metal fibers, e.g. by means of spraying, immersion in a bath or a lick roll; wherein all fibers in the yarns are preferably metal fibers, e.g. stainless steel fibers; b) winding, preferably cross-winding, the yarn on a core to form a bobbin of yarn; and c) knitting or weaving said bobbin of yarn to form a knitted or woven fabric used for heat resistant separation.

BRIEF DESCRIPTION OF FIGURES IN THE DRAWINGS

FIGS. 5 (*a*) and (*b*) shows respectively the Scanning Electron Microscope (SEM) image of the non-oxidized and oxidized fabric of the invention.

FIG. 6 illustrates a comparison of the parabolic oxidation rate constant (kp) of the sample made according to the invention with the kp of the references available in the market.

MODE(S) FOR CARRYING OUT THE INVENTION

Figure 1:
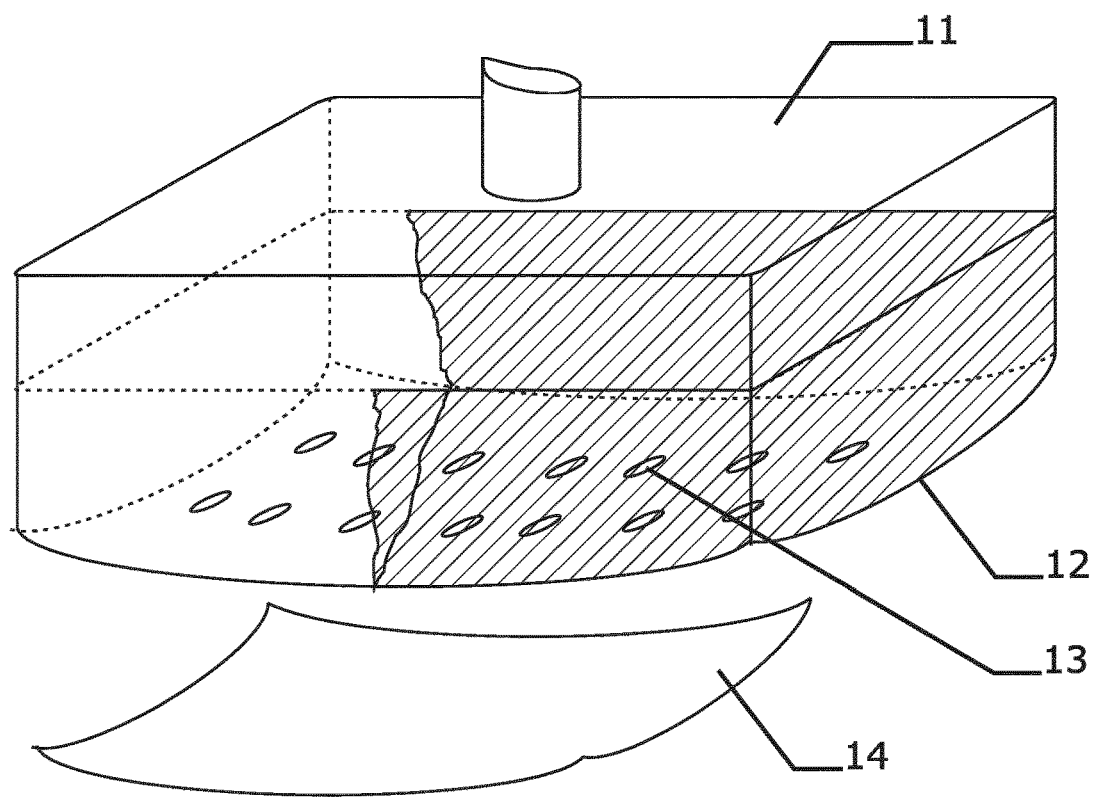
FIG. 1 shows a mould on which a separation fabric is mounted.

A schematic drawing of a glass shaping mould, covered with separation is given in FIG. 1. The mould 11 is here covered by a separation cloth 12 (shown partially). The glass 14, which is initially pre-cut but flat, sometimes already pre-shaped, is brought in contact with the mould 11 and the separation cloth 12, to transfer the shape of the mould into the glass 14. This can be done in many different ways. There is always a vacuum created between mould 11 and glass 14 when the glass 14 is in contact with the mould 11.

Figure 2:
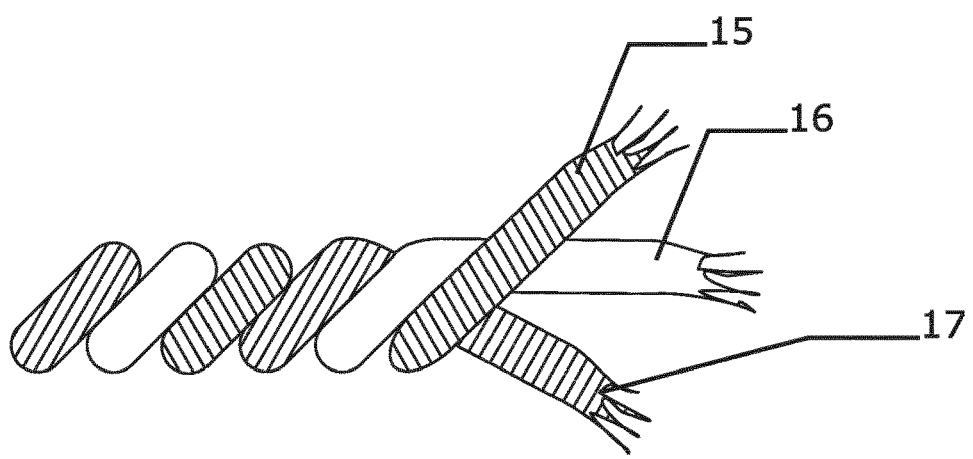
FIG. 2 shows a side view on a yarn with single yarns which consist out of one type of fibers.

Therefore air is sucked through the mould perforations 13 and through the separation cloth 12. It is part of the invention that at least one of the bundles or single yarns of the yarn used to provide the knitted fabric as subject of the invention comprises metal fibers. Metal fibers can be incorporated in the yarns of the fabric in different ways. It can be done by bundling (not shown) or in an alternative embodiment by plying a single yarn (see FIG. 2), out of 100% metal fibers 15, with other single yarns 16 and 17, e. g. made 100% out of another heat resistant fiber, or a blend out of two or more different heat resistant fiber types. The type of heat resistant fibers used to make the different single yarns 16 and 17 are not necessarily the same types, and the compositions are not necessarily the same. These single yarns 15, 16 and 17 can be multifilament yarns or spun yarns, e. g. rotor-or open end spun yarn, or ring spun yarn.

Figure 3:
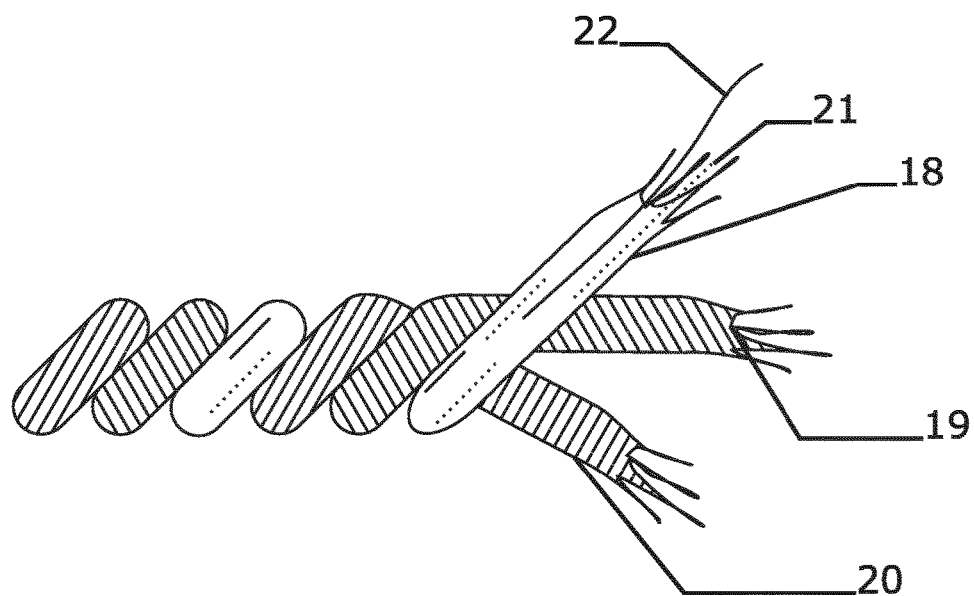
FIG. 3 shows a side view on a yarn with single yarns which are an intimate blend of different fibers.

Another way of incorporating metal fibers in the yarns is by assembling or in an alternative embodiment by plying different single yarns, from which at least one single yarn is a blend of metal fibers and at least one non-metallic, high temperature resistant fiber type. This is shown in FIG. 3, where single yarn 18 is made out of metal fibers 21 and non-metallic fibers 22. The other single yarns 19 and 20 are e. g. made 100% out of other heat resistant fibers, or a blend out of two or more different heat resistant fiber types. The type of heat resistant fibers used to make the different single yarns 18, 19 and 20 are not necessarily the same types, and the compositions are not necessarily the same. The single yarns 18, 19 and 20 can be multifilament yarns or spun yarns, e. g. rotor-or open end spun yarn, or ring spun yarn.

Figure 4:
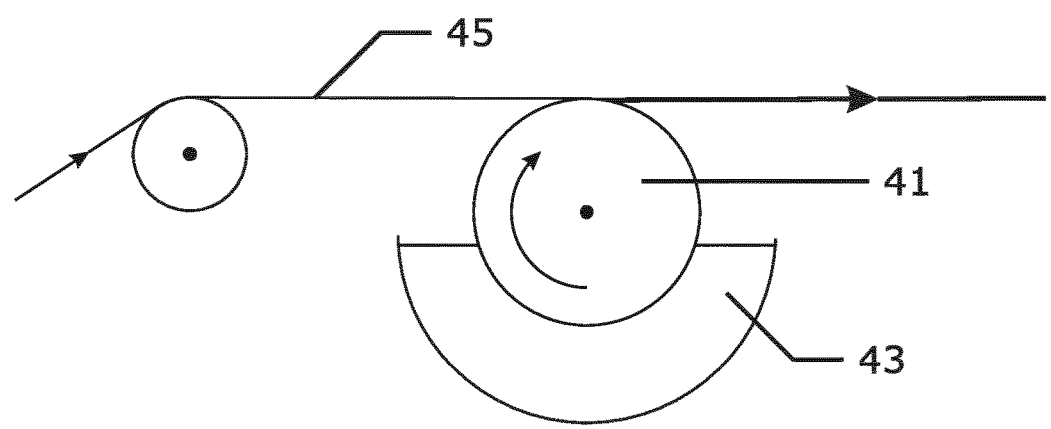
FIG. 4 shows a schematic view of a yarn of the invention undergoing a lick roll treatment.

The yarn of the present invention is specially treated such that boron nitride particles are present between the fibers in the yarns. As an example, the yarn is individually treated with boron nitride dispersion via lick roll (also called kiss roll). As shown in FIG. 4, a chromed roll 41 turns into boron nitride dispersion 43 and by this the boron nitride dispersion is transported towards the yarn 45 that runs along the upper side of the turning roll. At the exit of the lick roll a squeegee maybe installed that will scrape off the superfluous dispersion from the yarn 45.

As an example, aqueous boron nitride dispersion was prepared by diluting a commercially available aqueous gel of boron nitride and binder, contained 72 percent by weight boron nitride, 28 percent by weight aluminium phosphate binder, and 55 percent by weight of total solid phase. Using lick roll, boron nitride can be introduced upon yarns with a weight of 10 to 1000 g/m$^2$. The speed with which the yarn is introduced, the speed of the lick roll, their mutual contact pressure and surface area, the viscosity of the dispersion, the positioning of the squeegee determine the final amount of boron nitride present between the fibers. All yarns used for these examples are made out of 100% stainless steel fibers, with fiber diameters of 12 μm. The alloy used is AISI 316L.

The yarns with boron nitride inbeween are knitted into fabrics for heat separation applications. As some embodiments, the invention fabrics are given in the table underneath, where for different knitted structures, gauge, yarn Nm and knitting structure are given, together with the number of stitches per cm$^2$, thickness, weight and air permeability. The details on how the knitting structure made can be referred to the disclosure of patent EP1141457, which is incorporated herewith.

TABLE gauge, yarn Nm and knitting structure are given, together with the number of stitches per cm$^2$, thickness, weight and air permeability for different knitted structures

| Embodiment | gauge | structure | yarn (Nm) | stitches/ (cm$^2$) | air permeability (l/10 cm$^2$*h) | thickness (mm) | weight (g/m$^2$) |
| --- | --- | --- | --- | --- | --- | --- | --- |
| embodiment 1 | 16 | single jersey ⅓ | 7.5 | 91 | 6720 | 1.00 | 882 |
| embodiment 2 | 20 | single jersey ½ | 5.5 | 94.1 | 4550 | 1.25 | 1010 |
| embodiment 3 | 20 | single jersey ½ | 7.5 | 100.3 | 6750 | 1.00 | 741 |
| embodiment 4 | 20 | single jersey ⅓ | 5.5 | 101.1 | 3540 | 1.5 | 1192 |
| embodiment 5 | 20 | single jersey ⅓ | 7.5 | 124.5 | 4365 | 1.25 | 990 |
| embodiment 6 | 20 | single jersey ¼ | 7.5 | 111.1 | 4639 | 1.35 | 1090 |
| embodiment 7 | 24 | single jersey ½ | 5.5 | 96.7 | 5720 | 1.05 | 1016 |
| embodiment 8 | 24 | single jersey ½ | 7.5 | 106.0 | 8960 | 0.8 | 757 |

TABLE-continued gauge, yarn Nm and knitting structure are given, together with the number of stitches per cm², thickness, weight and air permeability for different knitted structures

| Embodiment | gauge | structure | yarn (Nm) | stitches/ (cm²) | air permeability (l/10 cm²*h) | thickness (mm) | weight (g/m²) |
|---|---|---|---|---|---|---|---|
| embodiment 9  | 24 | single jersey ⅓ | 5.5 | 109.3 | 4836 | 1.20 | 1121 |
| embodiment 10 | 24 | single jersey ⅓ | 7.5 | 123.6 | 5200 | 1.10 | 986 |
| embodiment 11 | 24 | single jersey ⅓ | 10  | 136.6 | 5800 | 0.95 | 826 |
| embodiment 12 | 24 | single jersey ¼ | 5.5 | 96.1  | 3828 | 1.4  | 1320 |
| embodiment 13 | 24 | single jersey ¼ | 7.5 | 114.5 | 4970 | 1.3  | 948 |

The fabric as produced (referred to as non-oxidized below) was tested compared with such a fabric oxidized in air at about 700° C. for 19 hours.

FIGS. 5 (a) and (b) respectively shows the Scanning Electron Microscope (SEM) image of the non-oxidized and oxidized fabric. The elongated elements are stainless steel fibers with an equivalent circular diameter of about 12 μm (which is also confirmed by the optic microscopy analysis). In the SEM images of FIGS. 5 (a) and (b), particles/residues (dark colored in Backscattered electrons (BSE) mode of SEM) can be observed on top and between the fibers. The particles/residues are uniformly distributed within the fabric. Energy-dispersive X-ray spectroscopy (EDX) is used for the elemental analysis or chemical characterization of the non-oxidized and oxidized fabric samples. The EDX analytical technique verifies the particles/residues on both the non-oxidized and oxidized fabric samples are composed of B and N (boron nitride). When comparing the non-oxidized (FIG. 5(a)) with the oxidized fabric sample (FIG. 5(b)), the oxygen content detected by EDX increases and it seems to be mainly present as Cr-oxides after heat treatment or oxidation.

An infrared spectrum of absorption or emission of the non-oxidized and oxidized fabric samples are detected by Fourier-transform infrared spectroscopy (FTIR). It is found that the FTIR spectra of the non-oxidized and oxidized fabric samples are identical in the region 1360 and 817 cm$^{-1}$. Those two regions can also be assigned to the presence of boron nitride. Thus, it is confirmed the presence of boron nitride on both the non-oxidized and oxidized fabric samples.

X-ray photoelectron spectroscopy (XPS) is a surface-sensitive quantitative spectroscopic technique that measures the elemental composition at the parts per thousand range, empirical formula, chemical state and electronic state of the elements that exist within a material. By means of XPS, a surface wide scan and a depth profile were performed at the surface of the non-oxidized and oxidized fabric samples. The sputter rate used is ±1.0 Å/sec (for α-Fe). The detected elements for both the non-oxidized and oxidized fabric samples are: B, C, N, O, Al, P, Cr, Fe, Ni, Mo and at the outermost surfaces other traces. Cr- and Fe-oxides are present at the outermost surface of the tested fabric samples. After heat treatment, mainly Cr-oxides are formed on the oxidized fabric sample. B, N (BN), P and Al (AlPO$_4$) can be distinguished by means of XPS, but cannot be accurately quantified due to several peak overlaps in this investigation. However, it is estimated that the presence of boron nitride and aluminium phosphate in the fabric is respectively in the range of 0.01 wt % to 1 wt %.

Resistance to oxidation is very important for separation cloth intended for glass shaping mould. Thermogravimetric analysis or thermal gravimetric analysis (TGA) is used to study the oxidation behaviour of the separation fabric of the present invention. TGA is a method of thermal analysis in which the mass of a sample is measured over time possible as the temperature changes. The weight gain due to oxidation of the sample made according to the invention is measured at about 700° C. The oxidation rate has been performed based on a parabolic oxidation law and is indicated by parabolic oxidation rate constant (kp). The kp of the sample according to the present invention is determined according to ISO 21608. The oxidation behaviour of the invention sample is also compared with similar products available in the market. As illustrated in FIG. 6, the kp of the sample made according to the invention is presented by A while the kp of the other references available in the market are presented by B, C, D and E. The kp of the invention sample (A) is about 0.0012 g² cm$^{-4}$ s$^{-1}$. The kp of similar products in the market can be approximately 10 times (C) or 20 times (E) of the kp of the sample made according to the invention. A very similar product, which is made by the yarns having the same construction and stainless steel composition but without boron nitride particles presented in the yarns, presents a kp (D in FIG. 6) more than 4 times of the kp of the sample made according to the invention. The kp of the best product found in the market (B in FIG. 6), which is subjected to expensive processes, is also significantly larger (about 30%) than the kp of the sample made according to the invention. These results illustrate that the fabric made according to the invention has significantly reduced oxidation rate and longer lifetime.

The invention claimed is:

1. A heat resistant separation fabric comprising yarns,
   wherein the yarns comprise metal fibers;
   wherein the heat resistant fabric comprises boron nitride particles distributed throughout the complete thickness of the fabric;
   wherein boron nitride particles are present between metal fibers in the yarns;
   wherein the amount of the boron nitride particles present on the surface of the fabric is less than the amount of the boron nitride particles present in the bulk of the fabric;
   wherein the boron nitride particles are bonded onto the surface of the metal fibers by means of an aluminium phosphate; and
   wherein the heat resistant separation fabric contains boron nitride and aluminium phosphate respectively in a range of 0.01 wt % to 1 wt %.

2. The heat resistant separation fabric according to claim 1, wherein the yarns are spun, filament or texturized yarns.

3. The heat resistant separation fabric according to claim 1, wherein all fibers in the yarns are stainless steel fibers.

4. The heat resistant separation fabric according to claim 1, wherein the heat resistant separation fabric is a woven fabric, a knitted fabric or a braided fabric.

5. The heat resistant separation fabric according to claim 1, wherein the particle size of the boron nitride particles is in the range of 1 nm to 10 µm.

6. The heat resistant separation fabric according to claim 1, wherein the boron nitride particles comprise boron nitride in the hexagonal crystalline form.

7. The heat resistant separation fabric according to claim 1, wherein the particle size of the boron nitride particles is in the range of 100 nm to 10 µm.

8. A mould for bending car glass products or mirrors, wherein a surface of the mould making contact with hot glass or mirrors is covered by the heat resistant separation fabric as in claim 1.

9. A process of bending car glass products or mirrors, wherein a mould is used as in claim 8, wherein the temperature of the hot glass in contact with the heat resistant separation fabric is in a range between 600° C. to 800° C.

10. A roll of a heat resistant separation fabric, comprising
the heat resistant separation fabric as in claim 1; and
a core onto which the heat resistant fabric is wound in a multiple number of layers.

* * * * *